(12) United States Patent
Ferguson

(10) Patent No.: US 6,829,005 B2
(45) Date of Patent: Dec. 7, 2004

(54) PREDICTING SUBJECTIVE QUALITY RATINGS OF VIDEO

(75) Inventor: Kevin M. Ferguson, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 511 days.

(21) Appl. No.: 09/992,066

(22) Filed: Nov. 21, 2001

(65) Prior Publication Data

US 2003/0095187 A1 May 22, 2003

(51) Int. Cl.$^7$ .................. H04N 17/00; H04N 17/02
(52) U.S. Cl. .................. 348/180; 348/189; 348/192
(58) Field of Search .................. 348/180, 189, 348/192; 382/228, 232, 233, 305, 323; H04N 17/00, 17/02

(56) References Cited

U.S. PATENT DOCUMENTS

| | | | | |
|---|---|---|---|---|
| 5,596,364 A | * | 1/1997 | Wolf et al. | 348/192 |
| 5,790,717 A | * | 8/1998 | Judd | 382/323 |
| 5,818,520 A | | 10/1998 | Janko et al. | |
| 6,496,221 B1 | * | 12/2002 | Wolf et al. | 348/192 |
| 6,577,764 B2 | * | 6/2003 | Myler et al. | 382/228 |

OTHER PUBLICATIONS

Confidential Report "Subjective Assessment of Sequences Using DSCQS and Impaired References" by The Communications Research Centre Canada RAVS/ATEL Oct., 2000.

* cited by examiner

Primary Examiner—Michael H. Lee
Assistant Examiner—Trang U. Tran
(74) Attorney, Agent, or Firm—Francis I. Gray

(57) ABSTRACT

A method of predicting subjective quality ratings of processed video from corresponding human vision model perceptual difference scores obtains perceptual difference scores for a "Worst" quality video training sequence and for a "Best" quality video training sequence. Corresponding subjective quality rating values are assigned to the perceptual difference scores as modified by any single-ended measures of impairments that may exist in the reference video training sequences from which the "Worst" and "Best" quality video training sequences are derived. A conversion function, which may be a piecewise linear function, an "S" curve function or other function that approximates the non-linearities and compression at the extremes of the subjective quality rating scale, is used to produce a conversion curve of calibration values based on the perceptual difference scores for the "Worst" and "Best" quality video training sequences and heuristically derived constants.

8 Claims, 2 Drawing Sheets

PREDICTING SUBJECTIVE QUALITY RATINGS OF VIDEO

BACKGROUND OF THE INVENTION

The present invention relates to video processing, and more particularly to a method of predicting subjective quality ratings of video from corresponding human vision model perceptual difference scores.

Although methods exist for producing perceptual difference scores that may correlate well under certain conditions with standard subjective quality ratings, such as Difference Mean Opinion Scores (DMSO), the actual numerical DMOS values depend among other things on "best" (least impaired) and "worst" (most impaired) video training sequences used to calibrate human subjects doing the scoring. Subjects are told to use a scale with one end for the "best" and the other for the "worst" video training sequence. Then video test sequences are rated by the subjects based on the "calibrated" scale. However the scale of subjective ratings for the video test sequences inherently has a compression near the top and bottom as subjects are conservative with quality ratings at the extremes, reserving a little portion of the scale just in case a more extreme video quality is seen in a later video test sequence.

The existing methods of determining video picture quality, such as that described in U.S. Pat. No. 5,818,520 and implemented in the Tektronix Picture Quality Analyzer PQA200, do not attempt to match DMOS scales for a set of video sequences, such as by using "best" and "worst" video training sequences to set the extremes. Instead correlations are made and typical conversion factors are cited. These typical conversion factors imply a one-to-one or linear mapping, not taking into account the compression at the extremes of the scale or other non-linearities inherent in the DMOS values.

What is desired is a picture quality measurement system that predicts subjective quality ratings of processed video.

SUMMARY OF THE INVENTION

Accordingly the present invention provides a method of predicting subjective quality ratings of processed video from corresponding human vision model perceptual difference scores by obtaining perceptual difference scores for a "Worst" quality video training sequence and for a "Best" quality video training sequence. Corresponding subjective quality rating values are assigned to the perceptual difference scores as modified by any single-ended measures of impairments that may exist in the reference video training sequences from which the "Worst" and "Best" quality video training sequences are derived. A conversion function, which may be a piecewise linear function, an "S" curve function or other function that approximates the non-linearities and compression at the extremes of the subjective quality rating scale, is used to produce a conversion curve of calibration values based on the perceptual difference scores for the "Worst" and "Best" quality video training sequences and heuristically derived constants.

The objects, advantages and other novel features of the present invention are apparent from the following detailed description when read in conjunction with the appended claims and attached drawing.

DETAILED DESCRIPTION OF THE INVENTION

Figure 1:
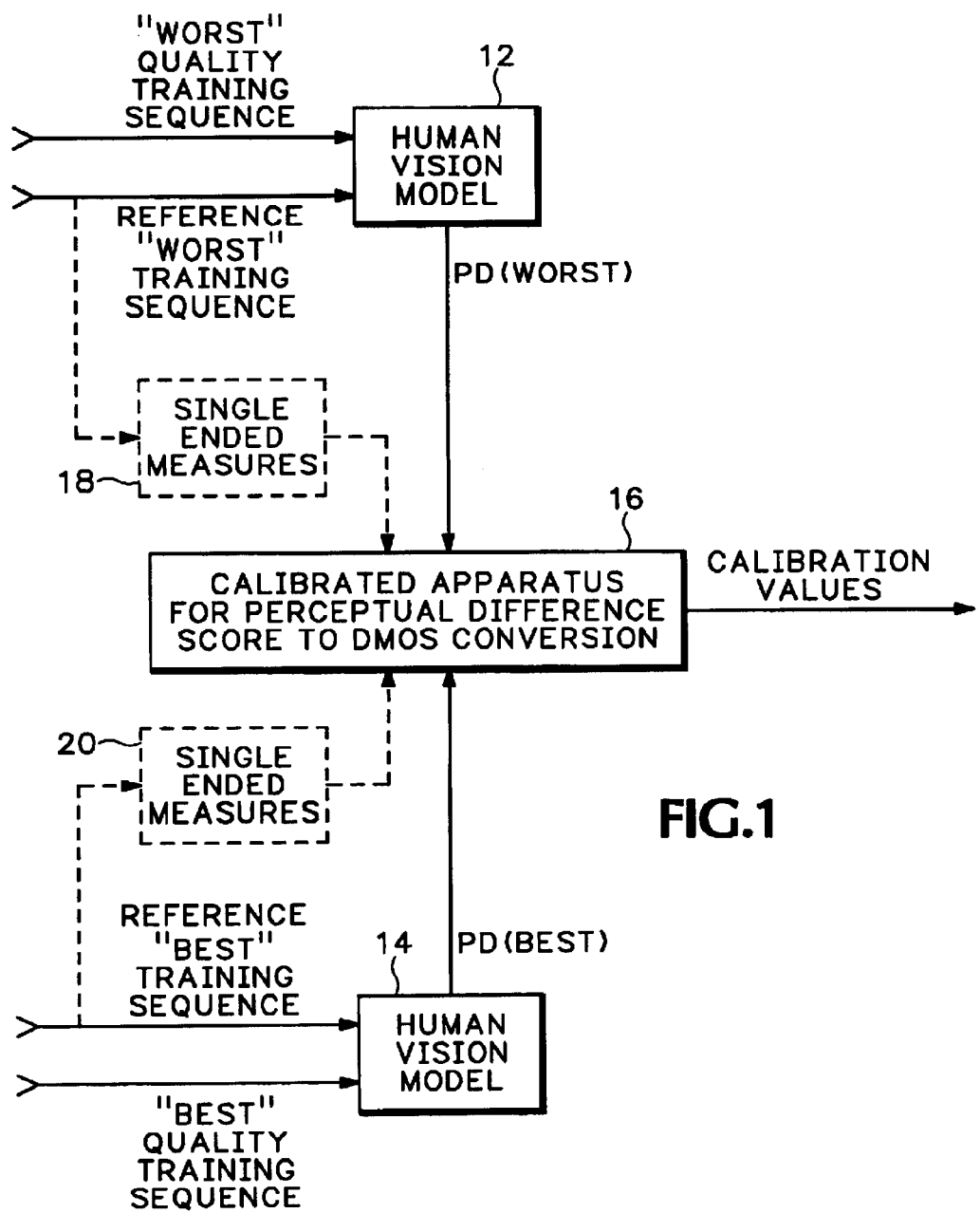
FIG. 1 is a block diagram view of an apparatus for predicting subjective quality ratings for processed video according to the present invention.

Referring now to FIG. 1 a first human vision model module 12 receives as inputs a reference (relatively unimpaired) video training sequence for a "Worst" video sequence and a processed version of the reference video training sequence as a "Worst" quality (impaired) video training sequence. Likewise a second human vision model module 14 receives as inputs a reference video training sequence for a "Best" video sequence and a lightly processed version—relative to the "Worst" case—of the reference video training sequence as a "Best" quality video training sequence. These "Worst" and "Best" quality video training sequences correspond to the "worst" and "best" video training sequences used in calibrating human subjects during a subjective video rating session for obtaining DMOS values. The human vision model modules 12, 14 may be the same module where the "Worst" and "Best" video training sequences are input sequentially, or may be separate modules as shown. The outputs from the human vision model modules 12, 14 are respective perceptual difference values, PD(Worst) and PD(Best), which are input to a calibrated conversion apparatus 16.

The reference video training sequences, which may or may not be the same for both the "Worst" and "Best" video training sequences, may also be input to respective single ended measurement modules 18, 20 in the event there are any impairments, such as blockiness, noise, blurring, etc., due to the reference video training sequences also having been processed previously. The single ended measures are then used to adjust the correlation of the perceptual difference scores with subjective quality ratings in the calibrated conversion apparatus 16.

To take into account the compression at the extremes of the scale and the scale itself, the video training sequences are rated with the human vision model based perceptual difference scores from the human vision model modules 12, 14, thus simulating the DMOS calibration training procedure. These extreme cases are used to identify 15 and 85 on the 100-point scale used in DMOS to compensate for the scale compression at the extremes.

The "Worst" quality video training sequence is used for setting the scale and compression threshold level of the perceptual difference score to be converted into a DMOS score for high end compression compensation. The corresponding reference video training sequence for the "Worst" quality video training sequence may be qualified using the single ended measurement module 18 with such metrics as blockiness, noise, blurring, etc. Where these values indicate "low impairment", the perceptual difference score for the "Worst" quality video training sequence may be assigned to be 70 instead of 85 with a compression knee starting at 55 on the DMOS scale. Likewise the "Best" quality video training sequence DMOS score may be assigned to a value greater than 15 if single ended measured impairments are high, or to a value less than 15 if single ended measured impairments are low or zero. Compression may be piecewise linear or some other function, such as an "S" curve function. An example for linear compression at the high end of the scale follows where the "Worst" quality video training sequence score is equated to a DMOS value of 70 as indicated above:

normPD=PDn/(PD(Worst)−Pd(Best))

where PDn is a perceptual difference score, n varying from zero to 100 in 0.02 increments, and normPD is a normalized PD score.

if(normPD<kneeThresh)

DMOS=normPD*scale else

Figure 2:
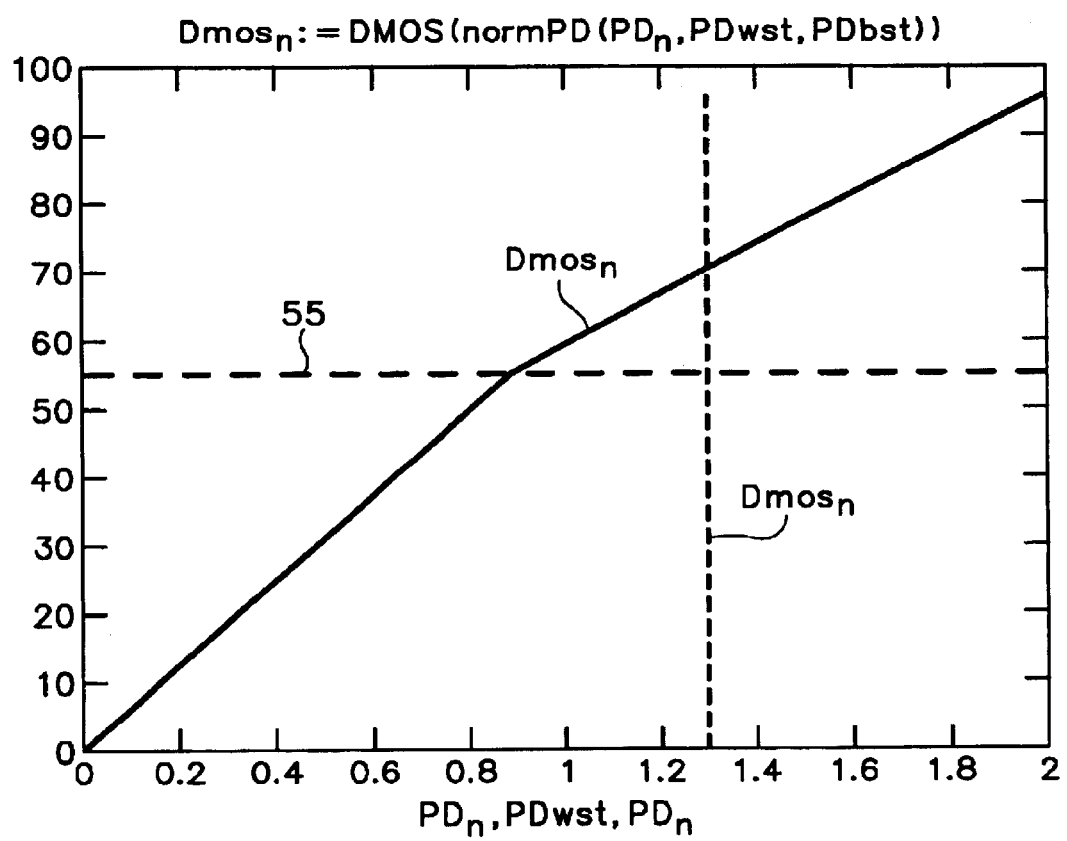
FIG. 2 is a plot view of an example calibration curve for converting from perceptual difference scores to subjective quality ratings according to the present invention.

DMOS=(kneeThresh+(normPD−kneeThresh)*compression)*scale where kneeThresh=0.66, scale=70/(kneeThresh+compression*(1−kneeThresh)), and compression=0.6. The values of compression and kneeThresh are interdependent, but are heuristically selected to produce a compression knee at approximately 55, i.e., kneeThresh*scale ≈55. A plot of the resulting DMOS values versus perceptual difference (PD) scores is shown in FIG. 2 where PD(Worst)=1.3 and PD(Best)=0 for this example. The vertical dotted line represents PD(Worst) and the horizontal dotted line represents the compression knee value of approximately 55.

A further similar piecewise linear approximation may be made for the low end scale compression so that there are three linear segments approximating an "S" function, i.e., if normPD<kneeThresh$_H$ and normPD>kneeThresh$_L$, one linear approximation is used, while for normPD>kneeThresh$_H$ a high end compression linear approximation is used and for normPD<kneeThresh$_L$ a low end compression linear approximation is used.

This simple compression of the PD scores at the extremes of the DMOS scale improves correlations with actual DMOS values, the amount of improvement being highly dependent on the distribution of quality ratings among an ensemble of video test sequences. Then any measured PD score for a video test sequence may be converted to a DMOS value using the calibrated conversion curve from the calibrated conversion apparatus 16.

Thus the present invention provides a method of predicting subjective quality ratings for a processed video sequence by generating a calibration curve for converting perceptual difference scores to difference mean opinion scores based upon perceptual difference scores for "Best" and "Worst" quality video training sequences and heuristically determined constants that accounts for compression at the extremes of the subjective quality rating scale.

What is claimed is:

1. A method of predicting subjective quality ratings for a processed video sequence comprising the steps of:

obtaining perceptual difference scores for a worst quality video training sequence and for a best quality video training sequence;

assigning to the worst and best perceptual difference scores corresponding subjective quality rating scores on a subjective quality rating scale that account for compression at the extremes of the subjective quality rating scale; and calculating from the worst and best perceptual difference scores and heuristically determined constants of a conversion function for converting perceptual difference scores to subjective quality rating scores on the subjective quality rating scale.

2. The method as recited in claim 1 wherein the obtaining step comprises the steps of:

inputting a first reference video training sequence corresponding to the worst quality video training sequence and the worst quality video training sequence to a first human vision model module to obtain the worst perceptual difference score; and inputting a second reference video training sequence corresponding to the best quality video training sequence and the best quality video training sequence to a second human vision model module to obtain the best perceptual difference score.

3. The method as recited in claim 2 further comprising the steps of:

obtaining single ended quality measures for the first and second reference video training sequences; and using the single ended quality measures to adjust the subjective quality rating scores corresponding to the worst and best perceptual difference scores.

4. The method as recited in claim 2 wherein the first and second reference video training sequences are a single reference video training sequence.

5. The method as recited in claim 2 wherein the first and second human vision model modules are a single human vision model module.

6. The method as recited in claim 1 wherein the calculating step comprises the steps of:

determining a compression knee for an extreme of the subjective quality rating scale; and determining the heuristically determined constants based upon the compression knee.

7. The method as recited in claim 6 wherein the calculating step further comprises the step of applying the best and worst perceptual difference scores and the heuristically determined constants to a series of piecewise linear functions to define the conversion function.

8. The method as recited in claim 7 wherein the calculating step further comprises the step of applying the best and worst perceptual difference scores and the heuristically determined constants to an "S"-shaped function to define the conversion function.

* * * * *